UNITED STATES PATENT OFFICE.

GEORGE E. FERGUSON, OF NEW YORK, N. Y., ASSIGNOR TO PYRENE MANUFACTURING COMPANY, A CORPORATION OF DELAWARE.

METHOD OF RENDERING CORROSIVE FLUIDS NON-CORROSIVE.

1,151,255. Specification of Letters Patent. Patented Aug. 24, 1915.

No Drawing. Application filed November 18, 1913. Serial No. 801,734.

*To all whom it may concern:*

Be it known that I, GEORGE E. FERGUSON, a citizen of the United States, and resident of the city, county, and State of New York, have invented certain new and useful Improvements in Methods of Rendering Corrosive Fluids Non-Corrosive, of which the following is a specification.

This invention relates to a method of rendering corrosive fluids non-corrosive, the object being to neutralize the corrosive agent usually absorbed by fluids exposed to the air.

Liquids, taken as a class of matter, have certain well defined properties. One of these properties is that, under certain conditions, liquids will absorb varying amounts of most gases. (Keeping in mind the distinction between absorption and a chemical combination with the liquid to form a new chemical compound, as, for example, ammonia gas and acetic acid liquid, in which case ammonium acetate is produced.)

We may consider gases, for our purpose, under two general heads: corrosive and non-corrosive gases.

It is understood that should it be desirable to maintain a liquid in a metallic vessel or container and that liquid should have absorbed a corrosive gas, the gas would attack the metal container and eventually render it useless.

The liquids about which we are particularly concerned are those classified as the halogen derivatives of the saturated and unsaturated hydrocarbons, the liquids having carbon, hydrogen and halogen, as well as those having only carbon and halogen in the molecule. Examples of these compounds are chloral, chloroform, carbon tetra-chlorid, acetylene tetra-chlorid, ethylene di-tri-tetra- or penta-chlorids, such as dichlor ethylene, $C_2H_2Cl_2$; trichlor ethylene, $C_2HCl_3$; perchlor ethylene, $C_2Cl_4$; tetra chlor ethane, $C_2H_2Cl_4$; penta chlor ethane, $C_2HCl_5$; etc., and likewise, the bromin, iodin, or fluorin compounds of the hydrocarbons, saturated and unsaturated. I have found and proven to be a fact, after careful study and extensive experiments, that oxygen is absorbed by all of these compounds, which oxygen attacks the metal containers, when made of easily oxidizable material as is usually the case, thereby corroding and rendering them useless in short time. As these liquids always come in contact with the air to greater or less degree, the supply of oxygen is readily at hand and the amount of corrosion which will result is practically unlimited. Commercially, this corrosion can be checked or stopped by the addition of an oxygen absorbent to the halogenated hydrocarbon. By an oxygen absorbent is meant a substance which will either combine chemically with the oxygen or which will physically hold the oxygen, thereby preventing it from attacking the metal.

Among the oxygen absorbents which I have found useful for this purpose is benzaldehyde, which is a compound having the composition, by weight, of seven parts carbon, six parts hydrogen and one part of oxygen. It has an empirical formula of $C_6H_5CHO$, known commercially as "oil of bitter almonds," and is prepared by the oxidation of benzyl alcohol with strong nitric acid. It is more easily prepared in small quantities by oxidizing benzyl chlorid with copper nitrate.

Benzaldehyde is a colorless liquid, boils at 179 deg. C., is very soluble in the halogenated hydrocarbons and upon exposure to air quickly oxidizes to form benzoic acid. It seems that upon exposure to air benzaldehyde first takes up a molecule of oxygen and forms the peroxid of bezoic acid $(C_6H_5CO.OH)$ which, in turn, acts as the oxidation agent in the process, yielding nascent oxygen to another benzaldehyde molecule and becoming itself converted into benzoic acid. Benzaldehyde acts in the capacity of preservative to prevent the oxidation of iron when in the presence of the halogenated hydrocarbons, but as it acts chemically upon copper it is useless as a preservative in the cases of copper or brass.

Toluene, otherwise known as phenyl methane or methyl benzene, (having a formula of $C_6H_5CH_3$), benzyl chlorid and benzal chlorid, are other oxygen absorbents which I have found can be used with containers made of either copper or iron, in connection with the halogenated hydrocarbons. Toluene has the advantage of being a halogen absorbent as well as an oxygen absorbent, and may be used effectively for these corrosive substances.

The "aldehydes" as a class of compounds, whether aliphatic or aromatic, are substances easily oxidized and could undoubtedly be employed with greater or less success.

A further distinct advantage and useful result is obtained by the use of an oxygen absorbent which will form an insoluble substance upon oxidation. Benzaldehyde, used as described, will form benzoic acid, an insoluble crystalline compound which drops out of the reaction.

A number of these halogenated hydrocarbons are used in fire extinguishing mixtures or are themselves fire-extinguishers and some of the oxygen absorbents named are inflammable substances. This does not prohibit the use of the same, however, as the percentage of the absorbent is relatively so small that the atmosphere of the fire-extinguishing mixture produced at the seat of combustion will not permit the absorbent to become a factor in the fire.

It will thus be seen that a practical method of rendering corrosive fluids non-corrosive, from the commercial standpoint, is possible by the use of an oxygen absorbent which will chemically combine with the oxygen, the oxidizing agent, absorbed or held by the fluid. The advantages and useful results of such a method will be obvious, especially in the case of various fluids which are ordinarily placed in metal containers, either for shipment or for other purposes and, as it is impracticable commercially to make these containers air-tight or to exclude the air from having access to the fluid, it becomes important to overcome and prevent the corrosion which would naturally result.

I do not wish to be understood as limiting my invention to the specific substances herein set out as illustrative of the types of substances which may be employed, or to the specific fluids with which the oxygen absorbents may be used, as it is undoubtedly possible to substitute other ingredients or to vary the method as defined in the appended claims without departing the spirit of the invention.

What I claim is:—

1. The method of rendering corrosive fluids non-corrosive which consists in the addition of an absorbent capable of taking up the corrosive agent from the fluid.

2. The method of rendering corrosive fluids non-corrosive which consists in the addition of an oxygen absorbent capable of taking up the oxidizing agent from the fluid.

3. The method of rendering corrosive fluids non-corrosive which consists in the addition to a fluid which is capable of absorbing a corrosive gas, of an absorbent capable of absorbing said gas therefrom and preventing its corrosive action.

4. The method of rendering corrosive fluids non-corrosive which consists in the addition to a fluid which is capable of absorbing oxygen gas, of oxygen absorbent capable of absorbing said gas therefrom and preventing its corrosive action.

5. The method of rendering corrosive fluids non-corrosive which consists in the addition to a fluid composed of a halogenated hydrocarbon, of an oxygen absorbent capable of rendering the oxygen gas absorbed by said fluid inactive as a corrosive agent.

6. The method of rendering corrosive fluids non-corrosive which consists in the addition to a fluid composed of a halogenated hydrocarbon, of an aldehyde capable of rendering the oxygen gas absorbed by said fluid inactive as a corrosive agent.

7. The method of rendering corrosive fluids non-corrosive which consists in the addition to a fluid composed of a halogenated hydrocarbon, of benzaldehyde capable of rendering the oxygen gas absorbed by said fluid inactive as a corrosive agent.

Signed at the city, county and State of New York, this 13th day of November, 1913.

GEORGE E. FERGUSON.

Witnesses:
   LEWIS J. DOOLITTLE,
   LOUELLA F. LITTLE.